US006735039B1

(12) United States Patent
Molstad (10) Patent No.: US 6,735,039 B1
(45) Date of Patent: May 11, 2004

(54) LINEAR POSITIONING ENCODING IN AMPLITUDE-BASED SERVOPOSITIONING SYSTEMS

(75) Inventor: Richard W. Molstad, St. Paul, MN (US)

(73) Assignee: Imation Corp., Oakdale, MN (US)

( * ) Notice: Subject to any disclaimer, the term of this patent is extended or adjusted under 35 U.S.C. 154(b) by 258 days.

(21) Appl. No.: 10/112,984

(22) Filed: Mar. 29, 2002

(51) Int. Cl.[7] ............................................... G11B 5/584
(52) U.S. Cl. .................................................... 360/77.12
(58) Field of Search ............................... 360/77.12, 75, 360/72.2, 48, 49, 53, 77.13, 77.03

(56) References Cited

U.S. PATENT DOCUMENTS

| 5,055,951 A | * | 10/1991 | Behr | 360/77.12 |
|---|---|---|---|---|
| 5,191,491 A | * | 3/1993 | Zweighaft | 360/77.13 |
| 5,394,277 A | * | 2/1995 | Pahr et al. | 360/53 |
| 5,568,327 A | * | 10/1996 | Pahr et al. | 360/53 |
| 5,689,384 A | | 11/1997 | Albrecht et al. | 360/77.12 |
| 5,920,439 A | | 7/1999 | Gillingham et al. | 360/48 |
| 5,930,065 A | | 7/1999 | Albrecht et al. | 360/72.2 |
| 5,973,869 A | | 10/1999 | Gillingham et al. | 360/49 |
| 5,982,574 A | * | 11/1999 | Leake et al. | 360/77.12 |
| 6,021,013 A | | 2/2000 | Albrecht et al. | 360/53 |
| 6,023,385 A | * | 2/2000 | Gillingham et al. | 360/48 |
| 6,134,070 A | * | 10/2000 | Tran et al. | 360/75 |
| 6,411,460 B1 | * | 6/2002 | Fasen | 360/75 |
| 6,493,174 B1 | * | 12/2002 | Stubbs | 360/77.12 |
| 6,574,066 B1 | * | 6/2003 | Stubbs et al. | 360/77.03 |

* cited by examiner

Primary Examiner—David Hudspeth
Assistant Examiner—Fred F. Tzeng
(74) Attorney, Agent, or Firm—Eric D. Levinson (57) ABSTRACT

Systems and methods for encoding linear position information in amplitude-based servopositioning systems, suitable for linear data recording on a medium such as magnetic tape, through use of amplitude or frequency modulation of the signal forming the servopositioning pattern on the medium.

24 Claims, 9 Drawing Sheets

LINEAR POSITIONING ENCODING IN AMPLITUDE-BASED SERVOPOSITIONING SYSTEMS

FIELD OF THE INVENTION

This invention concerns systems and methods for encoding linear positioning information in amplitude-based servopositioning systems suitable for linear data recording on a medium such as magnetic tape.

BACKGROUND OF THE INVENTION

Modern data storage systems use servopositioning (or "servo") systems to guide their recording and playback components with respect to a recording medium, and thus enable high track density, which increases data storage capacity. Errors in the ability to follow the servopositioning signals on the medium can cause unacceptable reductions in storage capacity, recording/playback rates, and other parameters that are important to consumers (and thus to system manufacturers).

One type of servo patterns or formats for linear magnetic tape recording systems employs so-called time-based servo techniques, examples of which are disclosed in U.S. Pat. Nos. 5,689,384; 5,930,065; and 6,021,013 (all of which are incorporated by reference in their entireties). Commercial magnetic tape drives such as the IBM model 3570 and drives known under the names "Ultrium" and "Accelis" as described by the Linear Tape Open consortium, use time-based servopositioning systems. In such systems, as taught in the patents noted above, one may encode linear position information by a type of common mode timing modulation.

Other types of servo schemes having encoded linear position information include that taught in U.S. Pat. No. 6,134,070, in which encoding is accomplished by modulating the size of the "window" portions of a servopositioning pattern. Another approach is disclosed in U.S. Pat. No. 5,920,439, in which a carrier burst of increased frequency represents a digital value. Yet another approach, disclosed in U.S. Pat. No. 5,973,869, synchronizes position error signal and linear position signals by using a jump in carrier frequency.

SUMMARY OF THE INVENTION

The invention is a servopositioning method and system for a data recording system employing a linear data recording medium, preferably magnetic recording tape. An amplitude-based servo signal format is written or recorded on the medium. The format comprises first, second, third, and fourth sections, each section having a respective amplitude, and each written over a respective period. The first and second sections together comprise a first interval, and the third and fourth sections together comprise a second interval. In each interval, the amplitudes of the sections are different from each other, and thus the system further comprises circuitry responsive to the signal amplitudes of the intervals for determining a position error signal (PES), i.e., a signal which measures the distance the servo head is away from the desired track center.

In one embodiment, the mean amplitude of the first and second intervals are different from each other, but the PES, because it is normalized, is not sensitive to this difference in mean amplitudes. That is, PES is proportional to the ratio of the amplitude of the second section to that of the first section, as well as to the ratio of the amplitude of the fourth section to that of the third section. The system further comprises circuitry responsive to signal amplitude for decoding linear position information encoded into the servo format. The encoding may be any scheme in which there are first and second states representative of information; for example, the first interval may represent a digital one and the second interval may represent a digital zero, or vice versa. Thus, the information is encoded according to an amplitude modulation (AM) scheme.

In another embodiment, the frequencies of the signals used to create the first and second sections (i.e., the first interval) are the same, as are the frequencies of the third and fourth sections (the second interval), but they are not necessarily equal to each other. The system further comprises circuitry, responsive to the signal frequency, for decoding linear position information encoded into the servo format. The encoding may be any scheme in which there are first and second states representative of information; for example, the first interval may represent a digital one and the second interval represent a digital zero, or vice versa. Thus, the information is encoded according to a frequency modulation (FM scheme.

In the AM scheme, the frequencies of the signals written to create the respective sections may or may not be equal to each other. In the FM scheme, the mean amplitudes of the first and second intervals may or may not equal each other. Thus, it is possible (but not required) to combine the AM and FM schemes by varying both the amplitude and frequency of the signals.

BRIEF DESCRIPTION OF THE DRAWINGS

The accompanying drawings show a particular embodiment of the invention as an example, and are not intended to limit the scope of the invention.

DETAILED DESCRIPTION

In general terms, the invention may be embodied in amplitude-based track-following servopositioning systems, methods, and formats, or in data recording media used in association with the same, and therefore this disclosure should be understood in that regard even if only an example of a particular embodiment is described in detail.

For example, the invention can be embodied in an entire system of data recording and playback, including the combination of a drive and a linear recording medium; or as only the recording medium portion of such a system; or as methods for recording or playing back data in combination with the data recording medium. Thus, while the following description may occasionally focus on only one aspect of an entire system (e.g., the recording medium alone) to disclose the preferred embodiment of the invention, this is by way of example only and not a limitation on the scope of the invention. It should be understood that the full scope of the invention includes other aspects of the system depending on the circumstances, such as combinations of the medium and drive, and methods of using such combinations or relevant portions of them.

Similarly, this disclosure should be understood to apply to either analog or digital signals, in accordance with principles known in the art. Thus, the terms "signal," "data" and the like may be used interchangeably, and should be understood to apply to either analog or digital representations of information.

Figure 1:
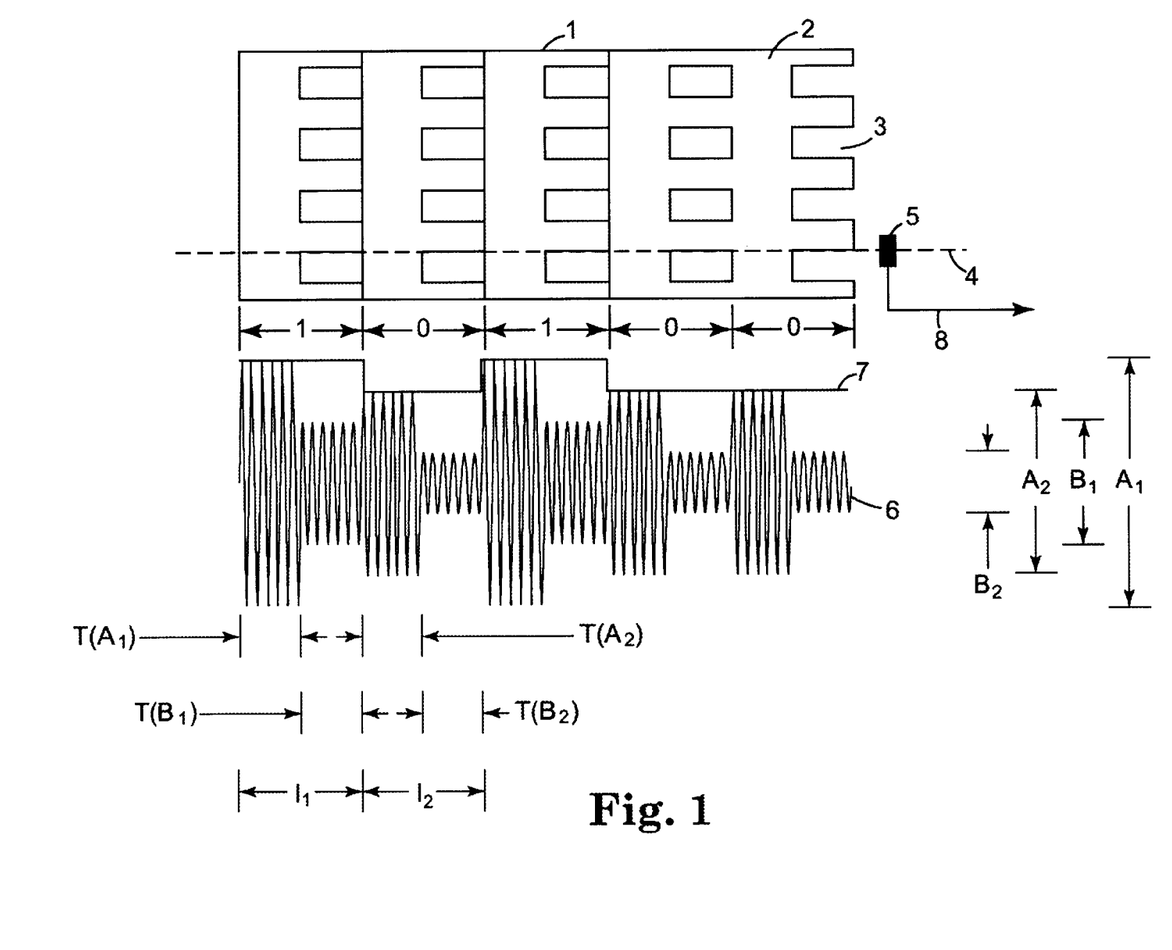
FIG. 1 is a schematic view of an amplitude-based servo pattern according to one embodiment of the invention.

The upper portion of FIG. 1 shows an embodiment of an amplitude-based servo band 1 according to the invention. As understood in the art, a sine wave recorded portion 2 of servo band 1 surrounds erased "windows" 3 as represented by white rectangles. The particular pattern shown has four windows located transversely across band 1, and therefore eight track pitches located at transverse edges of a longitudinal row of windows 3, such as representative pitch 4, because there are two transverse edges to each of the four series of windows 3. This is only an example, as the number of track pitches in a servo band does not limit the scope of the invention.

The lower portion of FIG. 1 shows a representation of the associated playback waveform 6 generated from servo band 1 by servo read head 5 when it is "on track" with respect to track pitch 4. Only a single servo read head 5 is shown for clarity, but in general there could be multiple servo read heads each generating their own respective playback waveforms. In many transverse servo systems for advanced linear tape recording, the servo system simultaneously reads more than one servo track to increase reliability. While some systems read only one servo track, if the number of data channels is more than four, the extra cost of an additional servo read gap is not considered excessively burdensome, and therefore such systems are candidates for the invention also.

In general, the $i^{th}$ portion of the waveform signal unaffected by the erased windows is referred to as the $A_i$ section of the waveform (i.e., it produces amplitude $A_i$), and the part affected by the erased window is called the $B_i$ section (it produces amplitude $B_i$). Similarly, $T(A_i)$ and $T(B_i)$ are the periods (lengths) of those sections. For convenience, FIG. 1 shows $T(A_i)=T(B_i)$ for all values of i but this is not a requirement of the invention.

Servo read signal 8 is produced by servo read head 5 and has a lower amplitude when servo read head 5 passes over a window than when it passes over a non-erased section, but the actual amplitude depends on the transverse position of the servo read head. Thus, measuring the relative amplitudes $A_i$ and $B_i$ (i.e., normalizing $B_i$ with $A_i$) determines the off-track position error signal (PES). This normalization process makes the process of determining PES insensitive to changes in the playback waveform amplitude over one total interval $I_i=T(A_i)+T(B_i)$. The invention uses this insensitivity to encode information (preferably linear positioning information) into the carrier signal 6 that creates the A and B portions, without affecting the value of PES. Thus, PES is proportional to $B_i/A_i$ for all values of i or $$PES \sim \frac{B_i}{A_i}$$

A specific, but not required, definition of PES in which the sign indicates the direction of deviation is $$PES = \left(\frac{B_i}{A_i} - \frac{1}{2}\right)*2$$

because PES=1 when $B_i=A_i$ (i.e., the head does not pass over the window at all), PES=0 when $B_i=A_i/2$ (i.e., the head is centered on the edge of the window, as desired), and PES=−1 when $B_i=0$ (i.e., the head passes over the entire extent of the window).

Carrier signal 6 is depicted as a moderate density sine wave that is amplitude modulated (AM) by a suitable digital signal 7. The bit period of digital signal 7 is exactly the same as the $I_i$ interval, and over that interval the amplitude of the carrier signal 6 is held constant. At the beginning of a new A period, the carrier amplitude is changed by some percentage of the mean amplitude, a percentage greater than the anticipated AM tape modulation, but less than an amount that would significantly affect the quality of the PES signal. The servo read head senses the changes in signal amplitude as a digital signal encoded into the PES signal. The roles of digital one and digital zero shown in FIG. 1 are arbitrary, and thus it is entirely equivalent to interchange the two values according to known principles without limiting the scope of the invention.

FIG. 1 shows a modulation of 33% by way of example only, and while up to 50% modulation may be used, the exact modulation percentage depends on the digital modulation code used, the type of error correction code (ECC), the desired error rate, the carrier density, and the inherent media modulation background noise level.

Summarizing this embodiment of the invention in terms of the two intervals $I_1$ and $I_2$ shown in FIG. 1 (intervals $I_1$ and $I_2$ are immediately adjacent to each other in FIG. 1 only for convenience of illustration), the servopositioning system comprises a linear data recording medium, upon which is recorded an amplitude-based servo signal format. The format comprises first, second, third and fourth sections having respective amplitudes $A_1$, $B_1$, $A_2$ and $B_2$, respective first through fourth periods $T(A_1)$, $T(B_1)$, $T(A_2)$ and $T(B_2)$, and first and second intervals $I_1$ and $I_2$ all satisfying:

$A_1 \geq B_1$ and $A_2 \geq B_2$ $T(A_1)+T(B_1)=T(A_2)+T(B_2)$ $I_1=T(A_1)+T(B_1)$ $I_2=T(A_2)+T(B_2)$ Also included in the system is circuitry, responsive to signal amplitude, for producing a position error signal (PES) as defined above, and preferably (but not necessarily) a PES which is given by $$PES = \left(\frac{B_i}{A_i} - \frac{1}{2}\right)*2$$

and circuitry, responsive to signal duration, for decoding linear position information encoded such that the signals over durations $I_1$ and $I_2$ represents first and second states representative of information, such as a digital one and a digital zero.

Figure 2:
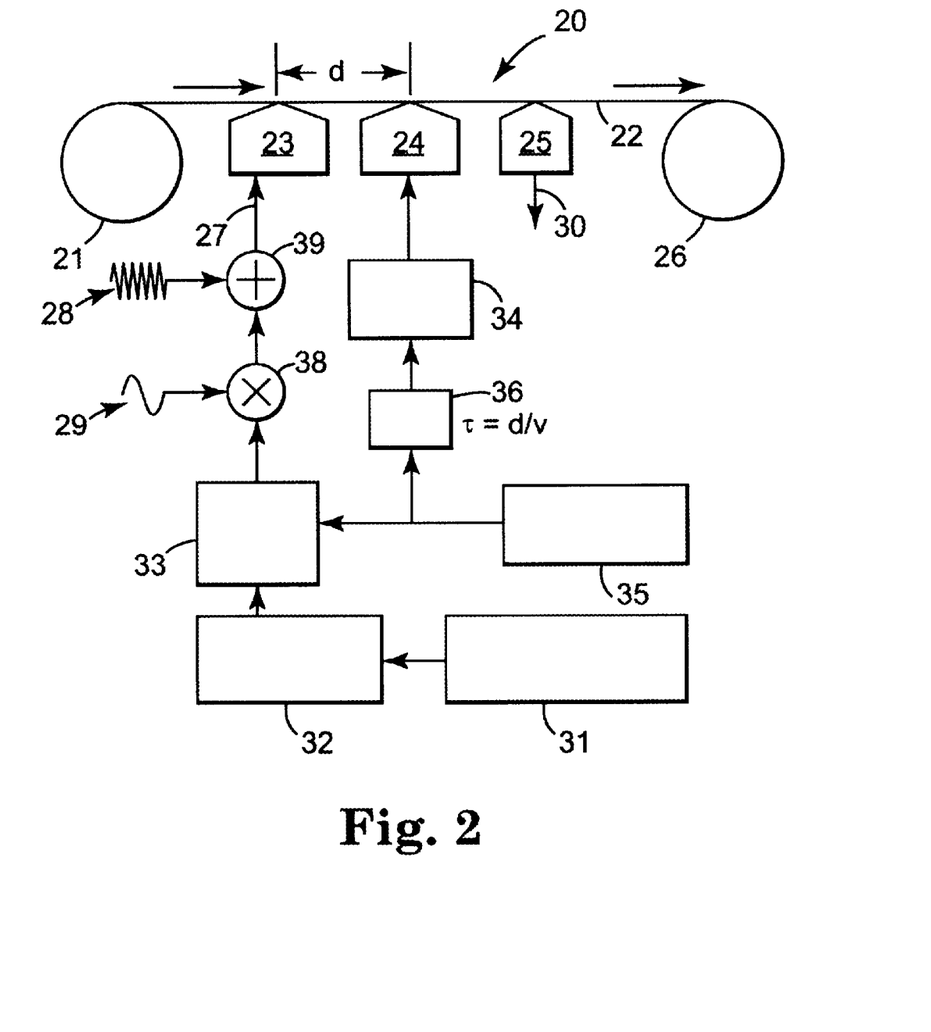
FIG. 2 is a schematic view of a system for implementing the servo pattern of FIG. 1.

FIG. 2 is a schematic view of one servowriting system embodiment of the invention, using (for purposes of illustration only) magnetic recording tape as the preferred type of linear recording medium. Servowriting system 20 comprises supply reel 21, tape 22 moving at velocity v, carrier recording head 23, window erase head 24 located a distance d from carrier recording head 23, verify play head 25, and take up reel 26. An AC bias signal 28 and carrier tone (modulation carrier) signal 29 are inputs to system 20. An erase burst generator signal 34 is the input to window erase head 24. Verify write head 25 produces verify signal 30 that typically passes through a conventional preamplifier and other conventional circuitry (not shown).

The linear positioning and other auxiliary information 31 is formatted into binary data and synchronization data by encoder 32. Look-up tables or mathematical transformations (or both) may be used to encode the data into forms more easily decoded. Error correction and error detection words may also be added to the data string at this stage. The formatted binary data string is the input to a channel code modulator 33. Here the binary data is further transformed to further enhance recording or detection properties. Channel codes such as Manchester or biphase codes are examples of simple and preferred codes. DC-free codes are also preferred as they make the average long-term signal amplitude constant. The output of this stage is combined by analog multiplier 38 with the carrier tone (modulation carrier) signal 29 to produce a double sideband AM modulation signal, which is on input to analog adder 39. The other input is AC bias recording signal 28. The result is the carrier recording signal 27. The bit timing for this data is the same as the bit rate of the erase windows 3. A common clock 35 triggers bit timing and, through a delay 36, the erase burst timing created at 34. The amount of delay T is dependent on the spacing d between the full-band carrier write head 23, and the erase head 24, i.e., τ=d/v.

Figure 3:
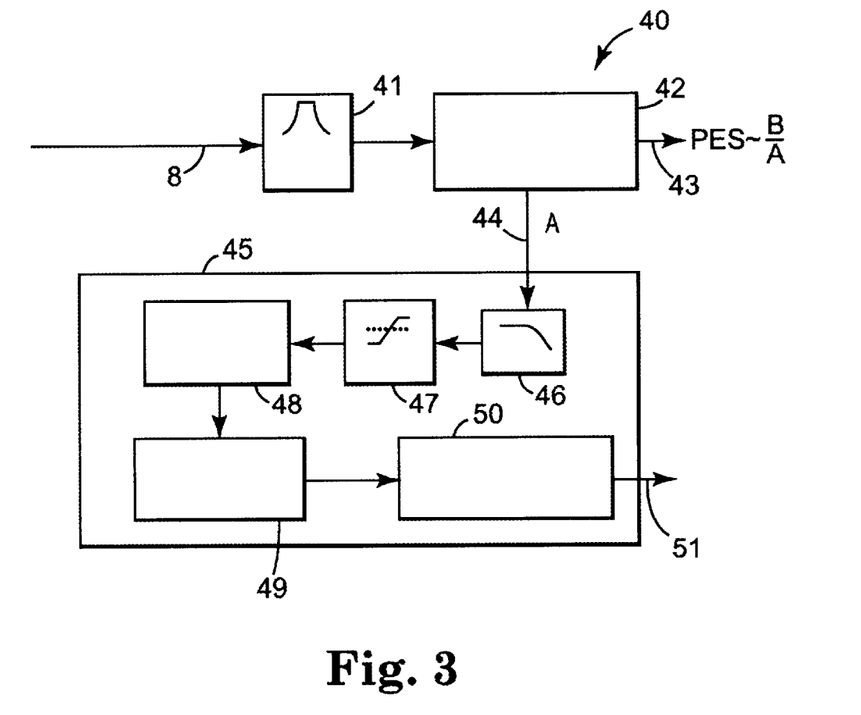
FIG. 3 is a schematic view of a system for decoding the servo pattern of FIG. 1.

FIG. 3 is a schematic diagram of circuitry for reading the servo read signal and its embedded information. The servo read signal 8 from servo read head 4 (and its conventional preamplifier that is not shown) is filtered by band pass filter 41, and demodulated in a conventional manner at 42, by detecting the $A_i$ and $B_i$ amplitudes and calculating the PES signal 43. In addition, the series of $A_i$ amplitude values 44 are demodulated in any convenient manner at 45. For example, the $A_i$ samples may pass through low-pass filter 46 and then detector 47, which detects short-term changes in their amplitudes by comparing instantaneous $A_i$ values to the average of the $A_i$ values. This comparison reproduces the modulating bit stream 7, which is then further decoded by the channel demodulator 48, and the data decoder 49 (which produces the linear positioning and auxiliary data 51).

Figure 4:
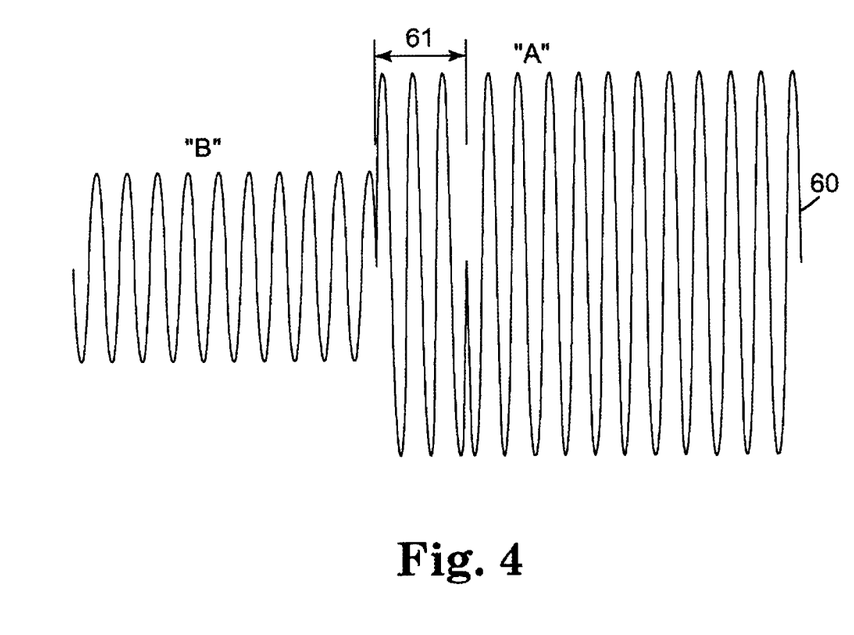
FIG. 4 is a schematic view of an amplitude-based servo pattern according to another embodiment of the invention.

FIG. 4 shows a preferred embodiment, in which a synchronization feature 61 in the servo format 60 enhances detection of the modulation (and the PES itself). In the example shown, three inverted carrier cycles are included at the very beginning of the "A" section. In general, between one and ten phase-altered cycles may be included. The altered phase of these cycles (which, in the case of inversion, is a 180 degree phase shift) would not normally affect the amplitude based detection circuitry of the PES, or the linear positioning modulation, but it is easily detectable by carrier timing counters using phase locked loops (PLLs). For example, a PLL locked to the carrier may generate a pulse (observable in the loop phase error) at every occurrence of a phase shift in feature 61. If the number of phase-altered cycles in feature 61 is about three, the phase error pulse is unambiguous, but the phase returns to normal before the PLL can be significantly affected. In general, any synchronization feature (such as the phase-altered sync pulse) may occur in every section (i.e., all A portions or all B portions) of servo pattern 60. Or, the synchronization feature may occur at discrete locations, e.g., the end of a data word or group of words encoded into servo signal 60.

In the embodiment of FIGS. 1–4, the modulation of the servo pattern 56 or 60 effectively modulates signal-to-noise ratio (SNR) of the PES of the servo pattern. The greater the amount of the linear positioning AM modulation, the greater the amount of modulation of the PES SNR. This creates a tradeoff between greater linear positioning SNR and greater PES SNR. To alleviate this tradeoff, the embodiment of FIG. 5 employs a differential AM linear positioning modulation technique. Servo bands 61 and 62 are complementary with respect to their amount ("depth") of linear positioning modulation, i.e., in sections 61a and 61c the depth is increased, and in sections 61b, 61d and 62e it is decreased. The pattern of increased and decreased depth is arbitrary provided that the patterns in each servo band are complementary to each other. The averaged PES from both channels 61, 62 has a constant PES SNR. An additional benefit is that the AM modulation index percentage needed for good linear positioning SNR performance is one-half that required otherwise.

Figure 5:
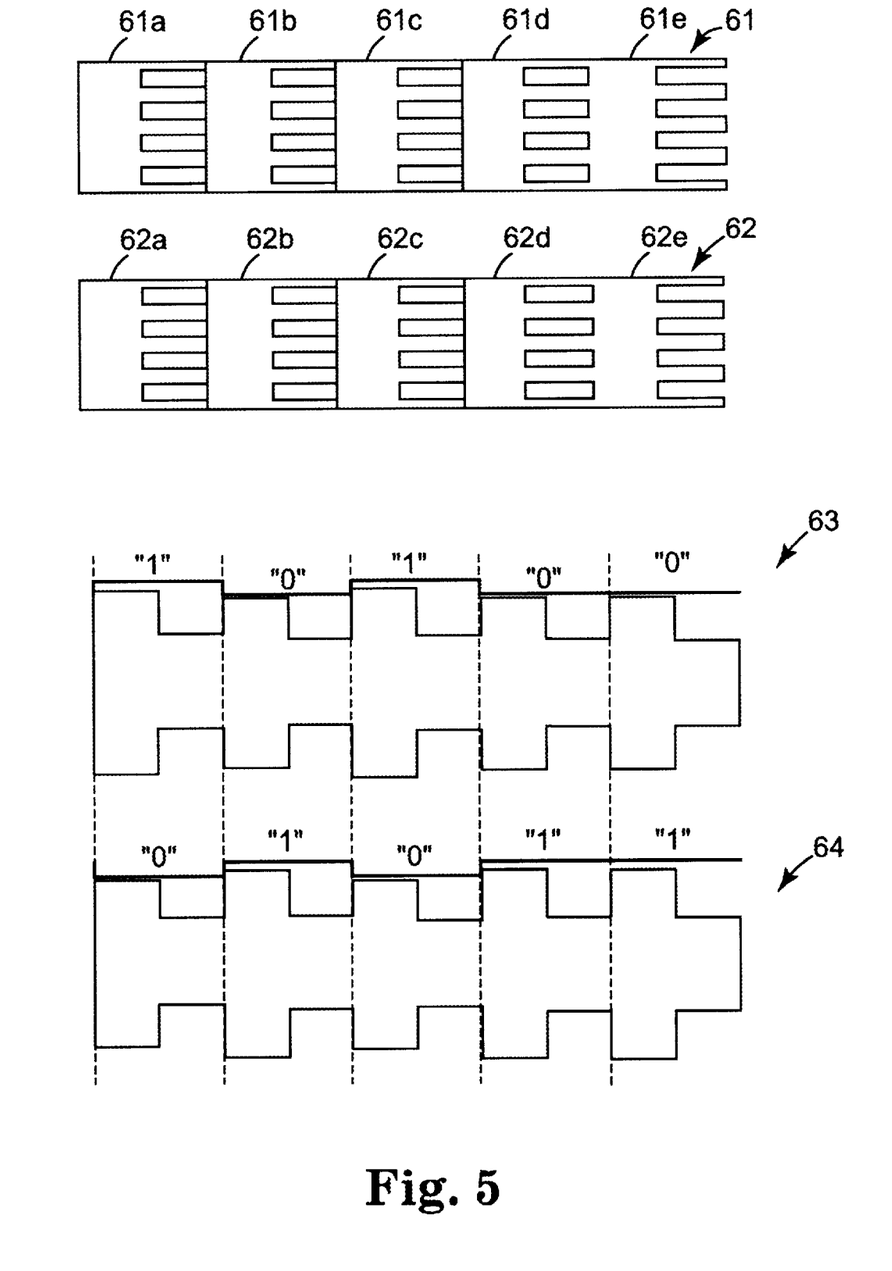
FIG. 5 is a schematic view of an amplitude-based servo pattern according to another embodiment of the invention.

The lower portion of the figure shows how the servo pattern 63, 64 would be detected by a reading head, which is perfectly on the center-line of any of the sixteen tracks in servo bands 61 and 62, respectively. (For purposes of clarity only, the individual waveform cycles in the pattern are not shown.) A preferred embodiment has ±5% amplitude modulation on each track (10% amplitude modulation in total), but this is only an example, as normal media modulation noise could exceed this amount (in which case the required amplitude modulation would be greater).

Figure 6:
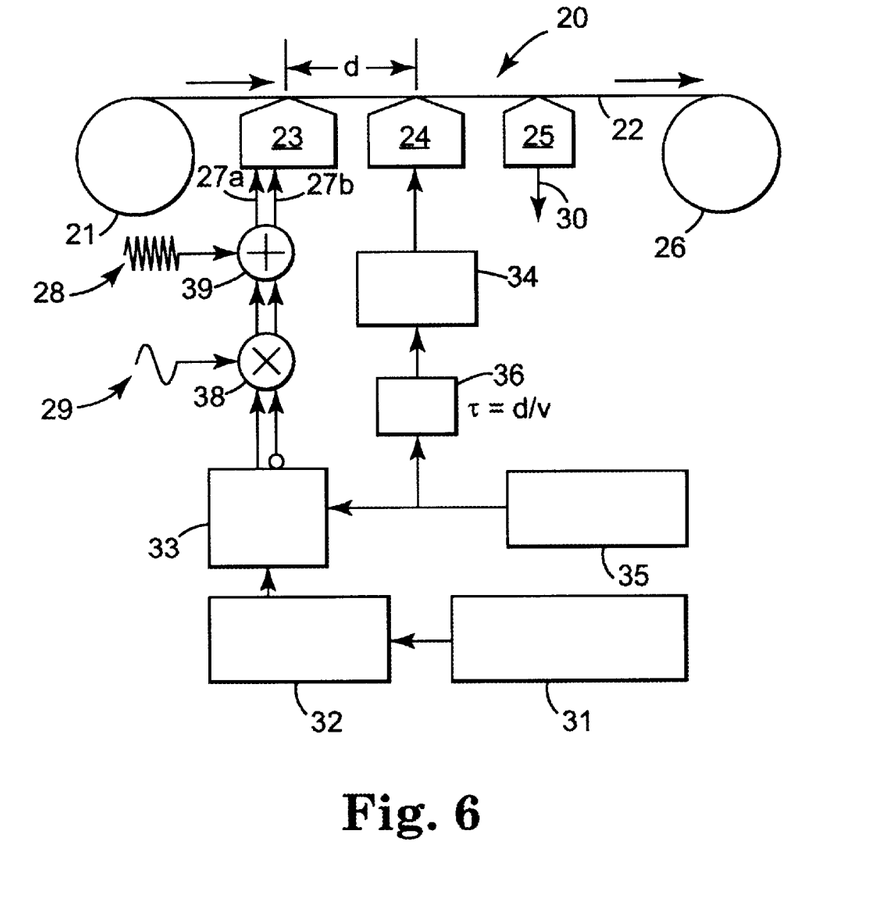
FIG. 6 is a schematic view of a system for implementing the servo pattern of FIG. 5.

FIG. 6 is a schematic diagram similar to FIG. 2, but modified for a scheme such as that of FIG. 5. Each polarity of the differential output of modulator 33 is AM modulated with the carrier tone 29 and bias recorded on either the odd or even servo tracks by signals 21a (even bands) or 27b (odd bands). As before, the linear positioning channel bit clock is precisely synchronized with the window erase burst; to keep the amplitude reference for each (A, B) pair constant over their interval.

In one embodiment, two "leaky" peak detectors, followed by a differential amplifier, decode the differential AM linear positioning signals. In another embodiment, the measured values of the $A_i$ signals are used to decode the linear positioning. If the linear positioning modulation code is DC free, such as a biphase code, the average value of the modulation is zero. Therefore, the sign of the difference between the ratios of the respective $A_i$ signals to their corresponding average values reflects the linear positioning data:

$$Sign(+,-)\left[\frac{A_{Even}}{Ave(A_{Even})} - \frac{A_{Odd}}{Ave(A_{Odd})}\right] \sim Binary(1,0)$$

The averaging integration time depends on the code used, but in the case of biphase encoding, it is only on the order of a few bits.

Figure 7:
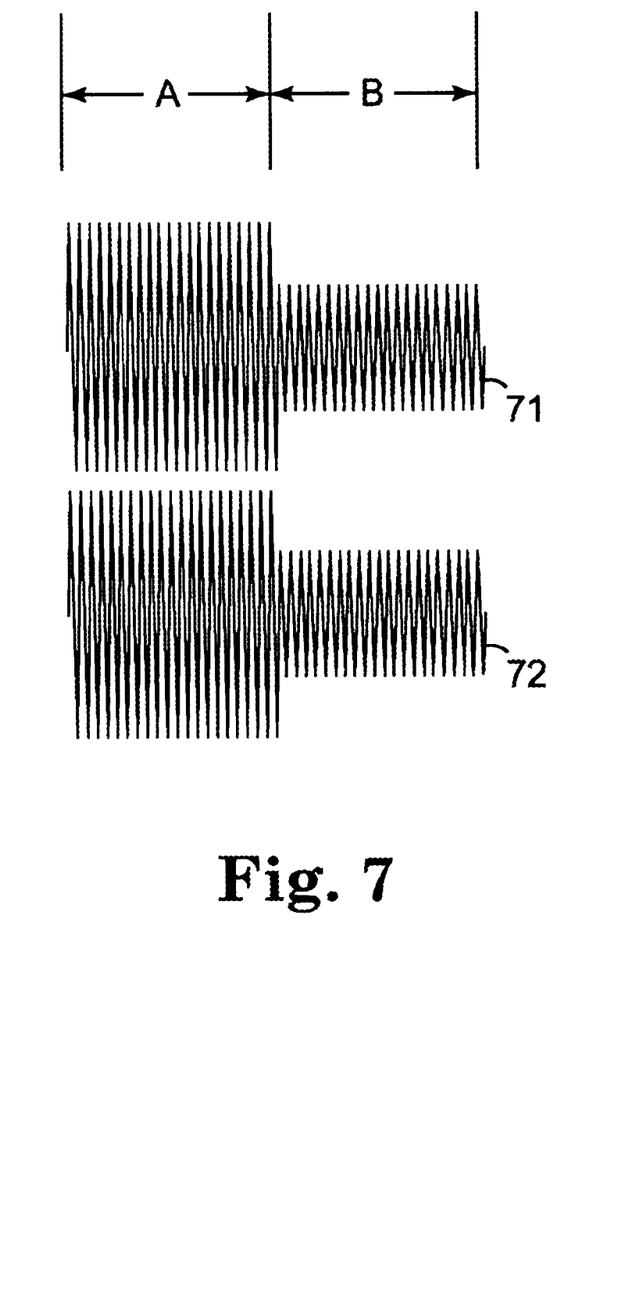
FIG. 7 is a schematic view of a frequency-based servo pattern according to another embodiment of the invention.

Yet another embodiment of differential signaling utilizes frequency modulation (FM) of the carrier to encode linear positioning. FIG. 7 schematically illustrates an embodiment in which two $A_i$ B samples 71, 72 differ from their respective counterpart sections in the number of carrier cycles, but not in amplitude. As illustrated, waveform 71 has forty-two carrier samples while waveform 72 has thirty-eight. An appropriately designed system can detect this amount of change in phase (4 cycles, or 1440 degrees of phase) even in the presence of considerable background signals in the medium (e.g., tape flutter). For example, dynamic tape skew looks like differential FM but is typically limited to amounts such as ±003 radians, which converts to ±120 degrees of change in carrier phase in certain embodiments.

The recording channel may not have a flat frequency response, and therefore writing a different carrier density would result in slightly altered playback amplitude. Since the frequency steps occur synchronously with the $I_i$ intervals, the normal PES demodulation amplitude normalization procedure automatically removes the effect on the PES of any unintended AM modulation caused by the FM linear positioning modulation.

Summarizing this embodiment of the invention in terms of the two intervals $I_1$ and $I_2$ shown in FIG. 1 (as before, intervals $I_1$ and $I_2$ are immediately adjacent to each other in FIG. 1 only for convenience of illustration), the servopositioning system comprises a linear data recording medium, upon which is recorded an amplitude-based servo signal format. The format comprises first, second, third and fourth sections having respective amplitudes $A_1$, $B_1$, $A_2$ and $B_2$, respective first through fourth periods $T(A_1)$, $T(B1)$, $T(A_2)$ and $T(B_2)$, respective first through fourth frequencies $f(A_1)$, $f(B_1)$, $f(A_2)$ and $f(B_2)$, and first and second intervals $I_1$ and $I_2$ all satisfying:

$$A_2 \geq B_1$$

$$A_2 \geq B_2$$

$$T(A_1)+T(B_1)=T(A_2)+T(B_2)$$

$$f(A_1)=f(B_1) \text{ and } f(A_2)=f(B_2)$$

$$I_1=T(A_1)+T(B_1)$$

$$I_2=T(A_2)+T(B_2).$$

Also included in the system is circuitry, responsive to signal amplitude, for producing a position error signal (PES) as defined above, and preferably one which satisfies $$PES = \left(\frac{B_i}{A_i} - \frac{1}{2}\right)*2$$

and circuitry, responsive to signal duration, for decoding linear position information encoded such that the signals over durations $I_1$ and $I_2$ represent first and second states representative of information, such as a digital one and a digital zero.

Figure 8:
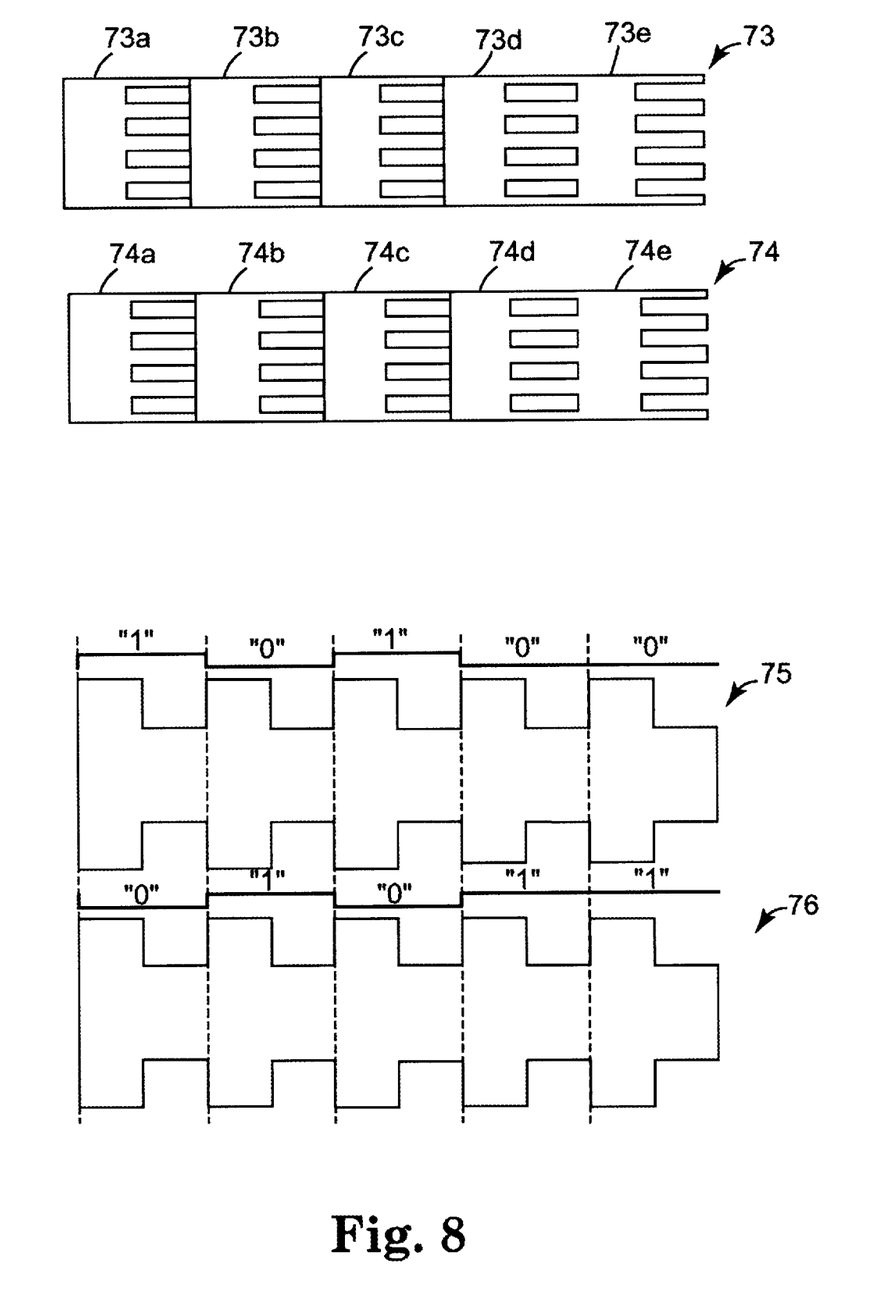
FIG. 8 is a schematic view of a frequency-based servo pattern according to another embodiment of the invention.

FIG. 8 is a schematic diagram similar to FIG. 5, but instead shows the FM modulated linear positioning pattern. Servo bands 73 and 74 are complementary with respect to their transition density, i.e., in sections 73a and 73c the transition density is increased, and in sections 73b, 73d and 73e it is decreased. The pattern of increased and decreased density is arbitrary provided that the patterns in each servo band are complementary to each other. As before, the lower portion of the figure shows the servo pattern 75, 76 as detected by a head perfectly on the center-line of any of the eight track pairs in servo bands 73 and 74, respectively. (Again, for purposes of clarity only, the individual waveform cycles in the pattern are not shown.)

Figure 9:
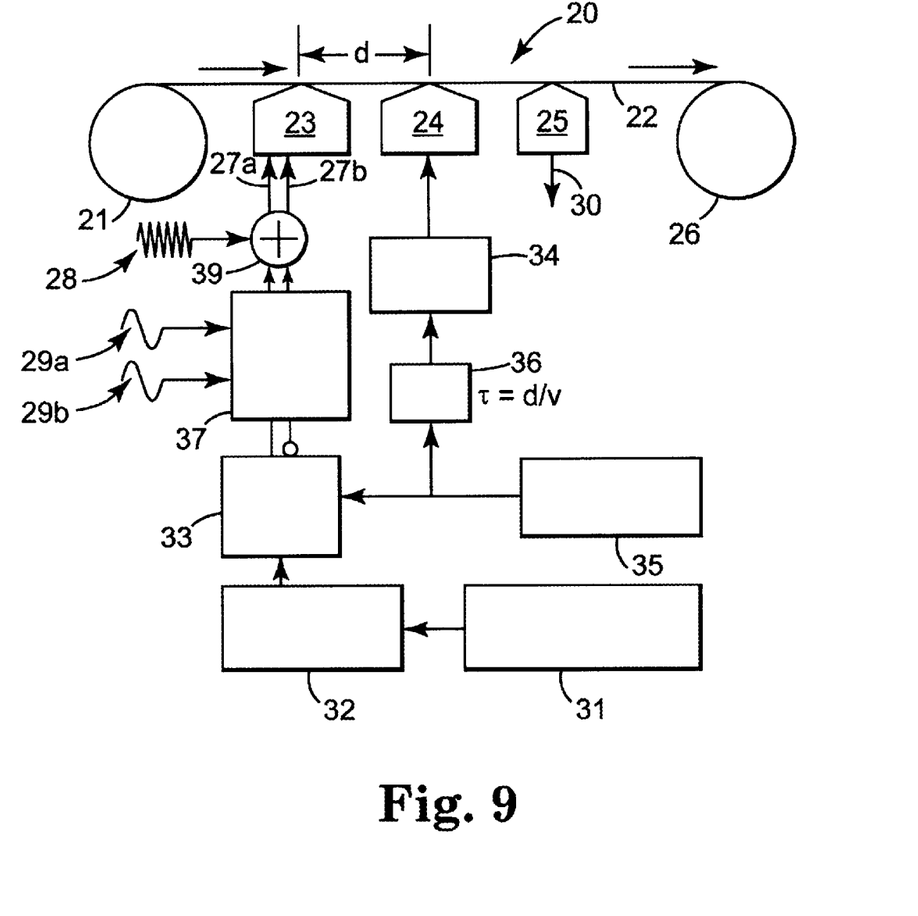
FIG. 9 is a schematic view of a system for implementing the servo pattern of FIG. 7.

FIG. 9 is a schematic diagram similar to FIG. 6, but modified for a scheme such as that of FIG. 7. Each polarity of the differential output of channel code modulator 33 is input to two high-speed selectors (or multiplexers) shown together at 37. These select complementary carriers, either higher frequency carrier 29a or lower frequency carrier 29b, depending on the state of the data signal. These carriers are then AC bias recorded as described above. As before, the linear positioning channel bit clock is precisely synchronized with the window erase burst; to keep the amplitude reference for each (A, B) pair constant over the $I_i$ interval.

The circuit for receiving the differential FM signals must reject common mode frequency instability. In one embodiment, this may be accomplished in a conventional manner by using two PLL circuits (to demodulate each FM signal separately), followed by a differential amplifier/comparator. Another embodiment, simpler and more integrated with the PES decoder, simply counts how many carrier cycles there are between B to A transitions in one servo band, and compares the result with the same process applied to the other servo band.

I claim:

1. A servopositioning system for a linear data recording system, comprising in combination:

a) a linear data recording medium, upon which is recorded a signal in the form of an amplitude-based servo format that comprises first, second, third and fourth sections having respective amplitudes $A_1$, $B_1$, $A_2$ and $B_2$, respective first through fourth periods $T(A_1)$, $T(B_1)$, $T(A_2)$ and $T(B_2)$, and respective first and second intervals $I_1$ and $I_2$, all satisfying $$A_1 \geq B_1 \text{ and } A_2 \geq B_2$$

$$T(A_1)+T(B_1)=T(A_2)+T(B_2)$$

$$I_1=T(A_1)+T(B_1)$$

$$I_2=T(A_2)+T(B_2)$$

b) circuitry, responsive to signal amplitude, for producing a position error signal (PES) satisfying $$PES_i \sim \frac{B_i}{A_i};$$

and c) circuitry, responsive to signal duration, for decoding information encoded such that the signals over durations $I_1$ and $I_2$ represent first and second states representative of information.

2. The system of claim 1, in which there are two complementary servo bands, each having the amplitude-based servo format.

3. The system of claim 1, further comprising at least one synchronization feature in the servo format to enhance detection of the signal.

4. The system of claim 3, in which the synchronization feature comprises at least one phase-altered cycle in the signal at the beginning of a section.

5. The system of claim 1, in which the encoded information comprises at least one of linear position data, manufacturing data, synchronization data, error detection data, and error correction data.

6. The system of claim 1, in which $$PES = \left(\frac{B_i}{A_i} - \frac{1}{2}\right)*2.$$

7. A servopositioning system for a linear data recording system, comprising in combination:

a) a linear data recording medium, upon which is recorded a signal in the form of an amplitude-based servo format that comprises first, second, third and fourth sections having respective amplitudes $A_1$, $B_1$, $A_2$ and $B_2$, respective first through fourth periods $T(A_1)$, $T(B_1)$, $T(A_2)$ and $T(B_2)$, respective first through fourth frequencies $f(A_1)$, $f(B_1)$, $f(A_2)$ and $f(B_2)$, and respective first and second intervals $I_1$ and $I2$, all satisfying:

$$A_2 \geq B_1$$

$$A_2 \geq B_2$$

$$T(A_1)+T(B_1)=T(A_2)+T(B_2)$$

$$f(A_1) \neq f(B_1) \text{ and } f(A_2) \neq f(B_2)$$

$$I_1 = T(A_1) + T(B_1)$$

$$I_2 = T(A_2) + T(B_2);$$

b) circuitry, responsive to signal amplitude, for producing a position error signal (PES) satisfying $$PES_i \sim \frac{B_i}{A_i}; \text{ and}$$

and c) circuitry, responsive to signal duration, for decoding information encoded in the respective frequencies such that the signals over durations $I_1$ and $I_2$ represent first and second states representative of information.

8. The system of claim 7, in which there are two complementary servo bands, each having the amplitude-based servo format.

9. The system of claim 7, further comprising at least one synchronization feature in the servo format to enhance detection of the signal.

10. The system of claim 9, in which the synchronization feature comprises at least one phase-altered cycle in the signal at the beginning of a section.

11. The system of claim 7, in which the encoded information comprises at least one of linear position data, manufacturing data, synchronization data, error detection data, and error correction data.

12. The system of claim 7, in which $$PES = \left(\frac{B_i}{A_i} - \frac{1}{2}\right) * 2.$$

13. A method of servopositioning in a linear data recording system, comprising:

a) recording on a linear data recording medium an amplitude-based servo format signal in a pattern that comprises first, second, third and fourth sections having respective amplitudes $A_1$, $B_1$, $A_2$ and $B_2$, respective first through fourth periods $T(A_1)$, $T(B_1)$, $T(A_2)$ and $T(B_2)$, and respective first and second intervals $I_1$ and $I_2$, all satisfying:

$$A_1 \geq B_1 \text{ and } A_2 \geq B_2$$

$$T(A_1)+T(B_1)=T(A_2)+T(B_2)$$

$$I_1 = T(A_1) + T(B_1)$$

$$I_2 = T(A_2) + T(B_2);$$

b) producing from the first through fourth amplitudes a position error signal (PES) satisfying $$PES_i \sim \frac{B_i}{A_i}; \text{ and}$$

and c) decoding, from interval durations, information encoded in the respective signals such that the signals over durations $I_1$ and $I_2$ represent first and second states representative of information.

14. The method of claim 13, in which the method comprises writing two complementary servo bands, each having the amplitude-based servo format.

15. The method of claim 13, further comprising writing at least one additional synchronization feature in the servo format to enhance detection of the signal.

16. The method of claim 13, in which the additional synchronization feature comprises at least one additional cycle in the signal at the beginning of a section.

17. The method of claim 16, in which the encoded information comprises at least one of linear position data, manufacturing data, synchronization data, error detection data, and error correction data.

18. The method of claim 13, in which $$PES = \left(\frac{B_i}{A_i} - \frac{1}{2}\right) * 2.$$

19. A method of servopositioning in a linear data recording system, comprising:

a) recording on a linear data recording medium an amplitude-based servo format signal that comprises first, second, third and fourth sections having respective amplitudes $A_1$, $B_1$, $A_2$ and $B_2$, respective first through fourth periods $T(A_1)$, $T(B_1)$, $T(A_2)$ and $T(B_2)$, respective first through fourth frequencies $f(A_1)$, $f(B_1)$, $f(A_2)$ and $f(B_2)$, and respective first and second intervals $I_1$ and $I_2$, all satisfying:

$$A_2 \geq B_1$$

$$A_2 \geq B_2$$

$$T(A_1)+T(B_1)=T(A_2)+T(B_2)$$

$$f(A_1) \neq f(B_1) \text{ and } f(A_2) \neq f(B_2)$$

$$I_1 = T(A_1) + T(B_1)$$

$$I_2 = T(A_2) + T(B_2);$$

b) producing from the first through fourth amplitudes a position error signal (PES) satisfying and $$PES_i \sim \frac{B_i}{A_i}; \text{ and}$$

c) decoding from signal duration information encoded in the respective frequencies, by reading the signal over interval $I_1$ as a digital one and the signal over interval $I_2$ as a digital zero.

20. The method of claim 19, in which there are two complementary servo bands, each having the amplitude-based servo format.

21. The method of claim 19, further comprising writing at least one additional synchronization feature into the servo format to enhance detection of the signal.

22. The method of claim 21, in which the feature comprises at least one additional cycle in the signal at the beginning of a section.

23. The method of claim 19, in which the encoded information comprises at least one of linear position data, manufacturing data, synchronization data, error detection data, and error correction data.

24. The method of claim 19, in which $$PES = \left(\frac{B_i}{A_i} - \frac{1}{2}\right) * 2.$$

* * * * *